Nov. 4, 1969  E. D. SATULA  3,476,026
OPTICAL SYSTEM
Filed Aug. 29, 1967  2 Sheets-Sheet 1
FIG. I
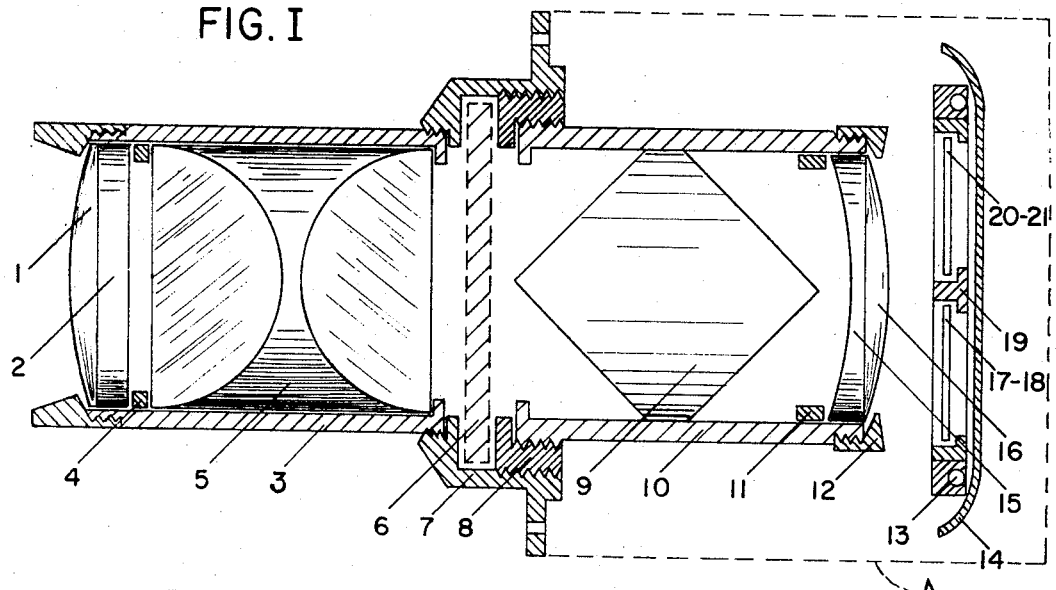
FIG. II
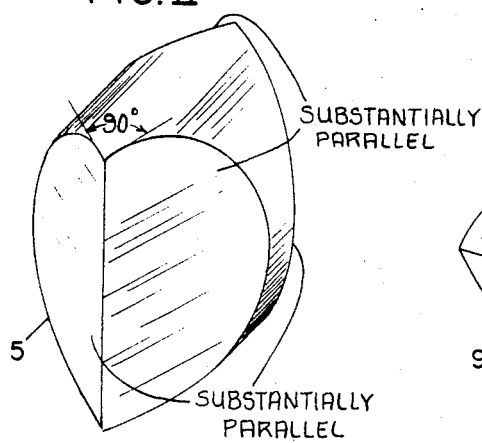
FIG. III
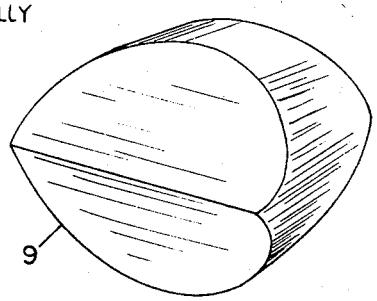
FIG. IV
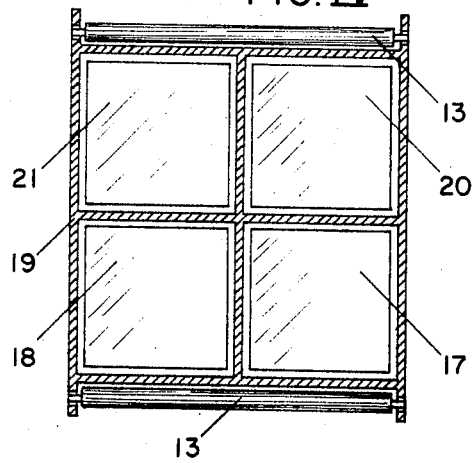
FIG. V
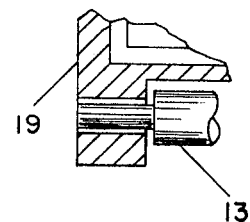
INVENTOR
Edward D. Satula Nov. 4, 1969
E. D. SATULA
3,476,026
OPTICAL SYSTEM
Filed Aug. 29, 1967
2 Sheets-Sheet 2
FIG. VI
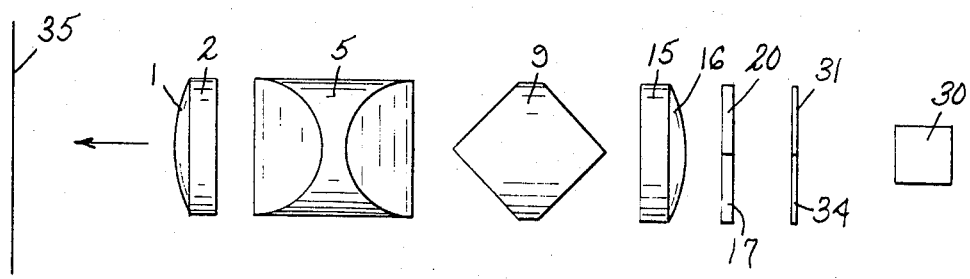
FIG. VII
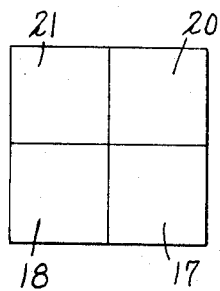
FIG. VIII
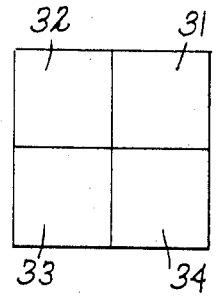
INVENTOR
Edward D. Satula
BY De Lio and Montgomery
ATTORNEYS United States Patent Office 3,476,026
Patented Nov. 4, 1969

3,476,026
OPTICAL SYSTEM
Edward D. Satula, Parker Hill Road,
Killingworth, Conn. 06417
Filed Aug. 29, 1967, Ser. No. 664,179
Int. Cl. G03b 35/08
U.S. Cl. 95—18          8 Claims

ABSTRACT OF THE DISCLOSURE

This invention is directed to optical systems which are useful in cameras in which a plurality of images is recorded on one plane and on one film negative. In particular, the optical system of this invention provides a first quad face prism, a second quad face prism, said first and second quad face prisms positioned in line with each other's longest center axis, and the second prism rotated substantially 90 degrees with respect to the first quad face prism.

---

This invention relates to optical systems and more particularly relates to an optical system for use with cameras and with projectors. In particular, the optical system of this invention is useful in cameras in which a plurality of images is recorded on one plane and on one film negative.

The prior art in this field of cameras has generally used a plurality of film strips for obtaining a plurality of images. The system of this invention does away with the requirement of a plurality of film strips for recording a plurality of images. In addition, this invention is an improvement over the prior camera techniques which require a plurality of film strips inside the camera to compensate for losses of refraction planes, processing and difficulties in synchronization of images, and results in a substantial savings in materials and developing time.

Accordingly, it is an object of this invention to provide a new and improved optical system for obtaining a plurality of negatives on a single film strip and in a single plane.

It is a further object of this invention to provide a projection system which utilizes a positive transparency of the plurality of negatives derived by the use of the optical system.

The objects and advantages of the invention will in part be obvious and will in part be apparent from the specification. The invention, accordingly, comprises the features of construction, combination of elements and arrangements of parts which will be exemplified in the constructions hereinafter set forth and the scope of the invention will be indicated in the claims.

For a fuller understanding of the invention reference is had to the following description taken in connection with the accompanying drawings, in which:

FIG. I is a top view partially in section showing the use of the optical system of this invention as a part of a camera;

FIGS. II and III are views of the prisms utilized in the optical system of FIG. I;

FIG. IV is a front view showing the filter arrangement and film holder arrangement shown in FIG. I;

FIG. V is an enlarged view of a portion of the filter frame shown in FIG. I;

FIG. VI is a schematic diagram showing the use of the optical system as a projector; and FIGS. VII and VIII are views showing the filter system and the positive transparency shown in the filter system of FIG. VI.

Referring now to FIGS. I–V, there is shown at A, as dotted, the outline of a camera. Camera A supports front lenses 1 and 2 which are supported in a lens housing 3 which is mounted in a housing supporting member shown at 7. Positioned within the housing 3 is a spacer ring 4 and a quad face cylindrical prism shown at 5 in FIGS. I and II. Positioned within the member 7 is a shutter shown at 6 for preventing light from getting into the camera except upon command. The shutter is shown in this position but it should be understood that the position of the shutter may be varied in accordance with the type of camera utilized and is not critical. Supported within the camera A is a threaded member 8 which supports a housing 10 and a threaded ring member shown at 12. Within the housing 10 there are positioned quad face cylindrical prisms 5 and 9 as shown in FIGS. II and III, the prisms 5 and 9 being of the same general shape. Also positioned within the housing 10 is a spacer ring shown at 11 and a double lens shown at 15 and 16. The rear lenses 15 and 16 are optional for the purposes of this invention as shown in the preferred embodiment.

In a further feature of this invention there are provided four color filters shown at 17, 18, 20 and 21 which are mounted in a filter frame shown at 19. In addition, there are provided a plurality of film rollers shown at 13 mounted in the frame 19 for transporting film strip shown at 14 past the filters.

The purpose of the filters is to provide a means for generating a color image on a screen from a black and white transparency. In a preferred embodiment, filter 21 is selected as a light red filter; filter 20 is selected as a pale blue filter; filter 18 is selected as a light blue filter, and filter 17 is selected as a yellow filter. It is to be understood that the choice of the color filters can vary depending upon the type of reversal black and white film chosen for the subject matter. The system of this invention could also be used with filters which operate in the infrared region.

In operation, the lenses 1 and 2 form a single image which then passes through the quad face cylindrical prism 5 which provides a duplicating image through the shutter and diaphragm arrangement shown at 6 and thence through the prism 9 which is, for the purpose of this invention, termed the quadrupler. The quadrupler prism 9 is locked in place after the front and back outer edges of this prism are set in a horizontal plane. This cylindrical quad face prism, which performs as a quadrupler, is in true sense an image doubler, but by placing two quad face cylindrical prisms in line with each other's longest center axis and by rotating the outer edges of this cylinder 9 quad face prism 90 degrees in relation to the vertical axis of the front quad face doubler 5, it takes on transformation characteristically as a quadrupler and refracts four images on through the four color filters 17, 18, 20 and 21 that are mounted on the frame 19 and onto a photographic film 14 to be exposed. There is thus produced four images which appear in the same relationship to each other on a single film plane as the configuration of the filter arrangement.

In the preferred embodiment the focal length of the lenses 1 and 2 should be slightly longer than the total length of the two cylindrical quad face prisms so that proper focusing of the images can be achieved on the film plane without interference between the quadrupler prism 9 and the frame member 19, as a result of varying distances of the subject matter to the camera. It should be understood that the angle between the quad planes of the two prisms 5 and 9 can be varied slightly but this will result in a bunching or a grouping of the pattern of the images away from the centers of the filters. For the purposes of this invention, an angle of substantially 90 degrees is preferred since this appears to provide the optimum pattern spread.

Referring now to FIGS. VI–VIII, in these last three diagrams there is shown the use of the optical system described in FIGS. I–V used as a projector system. In these figures the like numbers represent like parts described with reference to FIGS. I–V. To use the optical system of this invention as a projector, there is provided at 30 a light source which is used to illuminate positive transparencies shown at 31–34 of the negative obtained from the black-white film 14 of FIG. I. These are then projected through the filters 17, 18, 20 and 21 and then through the lens system 15, 16, 9 and 5 and 2 and 1 onto a screen shown at 35. By the use of this filter arrangement in the projecting system, a color image may be obtained on the screen 35 having a high resolution and a high dimensional quality.

It will thus be seen that the objects set forth above among those made apparent from the preceding description are efficiently attained and since certain changes may be made in the above construction without departing from the spirit and scope of the invention, it is intended that all matter contained in the above description or shown in the accompanying drawings shall be interpreted as illustrative and not in a limiting sense. It is also to be understood that the following claims are intended to cover all the generic and specific features of the invention herein described and all statements of the scope of the invention which as a matter of language may be said to fall therebetween.

What is claimed is:

1. An optical system for generating a plurality of images comprising a first quad face prism, a second quad face prism, said first and second quad face prisms positioned in line with each other's longest center axis, and the second prism rotated substantially 90 degrees with respect to the first quad face prism.

2. A system according to claim 1 in which the quad face prisms comprise two pairs of light transmittable refracting surfaces, each pair of surfaces forming an angle of about 90 degrees between each other and one surface of each pair being substantially parallel to a surface of one of said other pair of surfaces.

3. An optical system according to claim 1 including a plurality of light filters arranged to filter a plurality of images provided by said prisms.

4. An optical system according to claim 2 including a plurality of light filters arranged to filter a plurality of images provided by said prisms.

5. An optical system according to claim 1 including a single strip of film for recording the images, said film positioned in back of the second prism.

6. An optical system according to claim 3 including a single strip of film for recording the images, said film positioned in back of the filters.

7. An optical system according to claim 5 including shutter means positioned to prevent the film from being exposed except on command.

8. An optical system according to claim 3 including a plurality of positive transparencies positioned in back of said filters and a light source in back of said positive transparencies positioned to project an image back through said prisms.

References Cited
UNITED STATES PATENTS 2,200,466  5/1940  Cristiani _____ 95—12.2
2,268,338  12/1941 Kober _____ 352—57

JOHN M. HORAN, Primary Examiner